United States Patent [19]

Bryan

[11] Patent Number: 5,271,054
[45] Date of Patent: Dec. 14, 1993

[54] PERIMETER GRID STRIP

[75] Inventor: William J. Bryan, Granby, Conn.

[73] Assignee: Combustion Engineering, Inc., Windsor, Conn.

[21] Appl. No.: 765,642

[22] Filed: Sep. 25, 1991

[51] Int. Cl.$^5$ .............................. G21C 3/32
[52] U.S. Cl. ...................... 376/443; 376/442; 376/439; 376/438
[58] Field of Search ............ 376/443, 442, 439, 438, 376/462, 441; 976/DIG. 61, DIG. 65, DIG. 71

[56] References Cited

U.S. PATENT DOCUMENTS

| | | | |
|---|---|---|---|
| 4,364,902 | 12/1982 | Feutrel | 376/441 |
| 4,388,269 | 6/1983 | Larson | 376/442 |
| 4,474,730 | 10/1984 | Hellman | 376/442 |
| 4,666,663 | 5/1987 | Steinke | 376/441 |
| 4,683,115 | 7/1987 | Fromel et al. | 376/439 |
| 4,705,663 | 11/1987 | Steven et al. | 376/442 |
| 4,765,949 | 8/1988 | Denizou et al. | 376/443 |
| 4,879,090 | 11/1989 | Perrotti et al. | 376/462 |

Primary Examiner—Donald P. Walsh
Assistant Examiner—Meena Chelliah
Attorney, Agent, or Firm—John H. Mulholland

[57] ABSTRACT

A nuclear fuel perimeter strip grid corner-piece (12) of increased flatness having at least two flat side sections (18,20) on either side of a transverse bend line (22) is provided. The flat side section (20) or sections (20 and 32) which have small cut-outs for arches (34), as opposed to large spring (36) cut-outs, as the fuel support features adjacent to the bend line (22) of variable radii at portions (24 and 26) are stress-relieved by means of slots (30) of length equal to ½ to ⅓ of the width of the flat section. The slot (30) is of a width less than twice the material thickness, so as not to weaken the structure near bend (22).

5 Claims, 3 Drawing Sheets

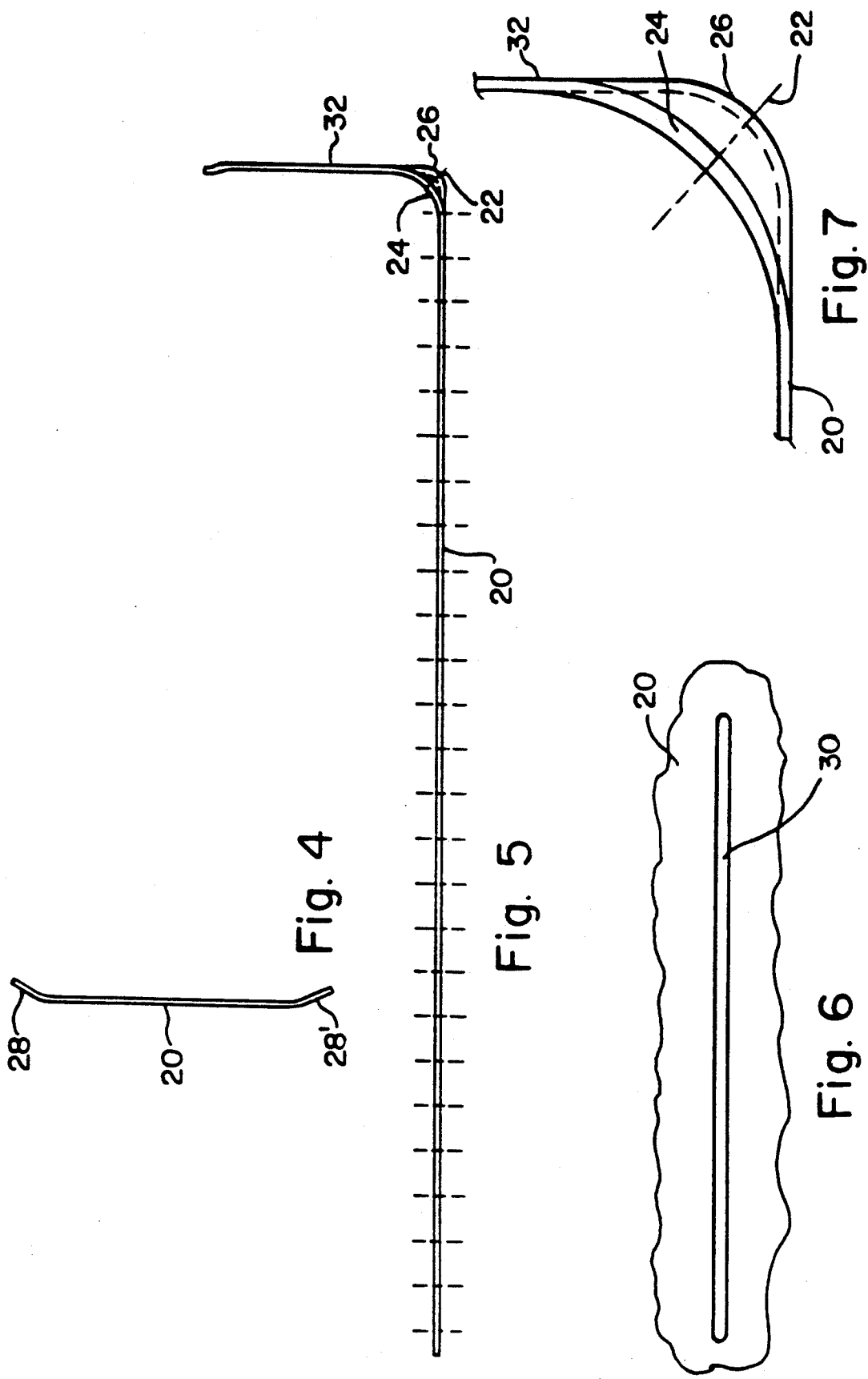

PERIMETER GRID STRIP

BACKGROUND OF THE INVENTION

The invention relates to the use of stress relieving slots in the forming of perimeter strip grid corner-pieces of increased flatness.

The grids are elements of nuclear fuel assemblies and particularly are useful as nuclear fuel assembly support grids designed to avoid hang-up of grid corners during insertion into the core of a nuclear reactor vessel. In the past, nuclear fuel grids were constructed with non-formed beveled corners. When loading or unloading nuclear reactors with individual fuel assemblies, assemblies diagonally adjacent to each other could become caught at the outer corner of the grid. This type of hooking has in the past lead to destruction of the perimeter strips of grids, so that the assemblies could not be re-inserted into the core. This is especially true for fuel assemblies which have been bowed during operation.

To overcome this problem, it has been proposed to use formed corners. See U.S. Pat. No. 4,705,663 to J. Steven. The corner would be formed by pushing the strip material inward toward the corner fuel rod at the top and bottom strip edges, thus causing the corner to curve inward forming a beveled corner and providing varying radii in the transverse direction with its outer longitudinal portions having a greater radius than its inner portion.

Since the corner has a larger bevel the problem of grid hooking less likely. However, these corners have not been used in grids with small cut-out features in the perimeter strips because flexing deformation occurred which destroyed the flatness of the flat side sections on either side of the transverse corner bend line. These deformations were caused by corner forming. This occurrence was denoted "oil canning" and was caused by attempts to design "camming-corner" perimeter strips.

SUMMARY OF THE INVENTION

To eliminate the problem of flexed deformation or oil canning, additional cut-outs of different sizes, shapes and types were made in the perimeter strip. A slot located next to the support features, i.e., the arches and the springs, if necessary, was determined to provide the best flatness characteristics. It was positioned to eliminate most of the corner forming stresses, thus eliminating the flexed deformation oil canning of the strip. The size of the slot was designed to allow the grid to maintain its overall mechanical strength while only slightly changing the grid's corner cell arch stiffness. Without the addition of these slots the formed beveled corner could not be produced on commercial Inconel grids for nuclear fuel assemblies with small cut-outs for arches and pilot holes.

The location and type of slot is not obvious. In fact, two metal forming experts consulted, who together have over 80 years of metal forming experience, did not believe the described slot would solve the problem. However, the addition of the slots eliminated the instability and flexed deformation in the strip and prevented oil canning to provide an improved perimeter strip grid corner-piece of increased flatness on either side of the transverse bend line.

BRIEF DESCRIPTION OF THE DRAWINGS

FIG. 4 is a cross-section taken on line 4—4 of FIG. 2;

FIG. 5 is a schematic of the strip of FIGS. 2-4 after being bent along a transverse bend line;

FIG. 6 is a typical stress-relieving slot of the invention;

FIG. 7 is a detailed view of the bend of FIG. 5 with the varying radii in its transverse direction shown.

DETAILED DESCRIPTION OF THE INVENTION

Figure 1:
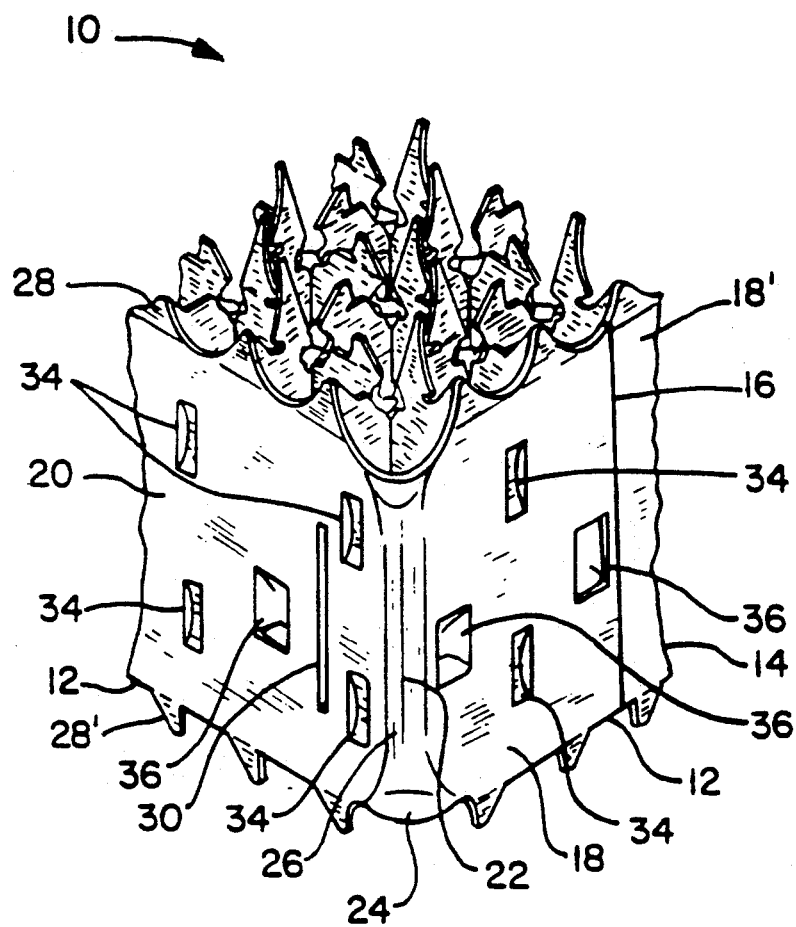
FIG. 1 is a schematic fragmentary perspective view of a typical fuel assembly grid corner region according to the invention having a perimeter strip grid corner-piece of increased flatness due to a stress relieving slot in the flat side section adjacent the transverse corner bend line having small cut-outs for fuel rod supporting arches adjacent the bend line, but not in the flat side section with a fuel rod supporting spring cut-out large enough to accommodate the corner forming stresses without the slot.

The numeral 10 generally designates a fuel assembly grid corner region which incorporates the principals of the invention. Evident are fragments of two perimeter strip pieces, 12 and 14 joined by a perimeter strip seam weld 16 which are formed to overlap at the extremities of flat plane side sections thereof, 18 and 18', respectively.

Another flat plane section 20 of the strip 12 is connected to the flat side section 18 by means of a transverse continuous corner bend 22 of varying radii, with its outer longitudinal end portions 24 having a greater radius that its inner portion 26. At the top and bottom margins of the flat side sections 18 and 20, are upper and lower anti-hang-up tabs 28 and 28', respectively.

In flat plane section 20 of perimeter strip piece 12 with its perimeter in said flat plane is a stress-relieving slot 30 which extends an equal slot perimeter length on either side of the longitudinal center line of the flat section 20. The length of slot 30 is approximately ⅛ to ½ of the width of the flat section 20. The width of slot 30 is preferably less than twice the thickness of the strip material which is typically a stainless steel such as "Inconel 625" or zirconium alloy such as "Zircaloy 4".

Figure 2:
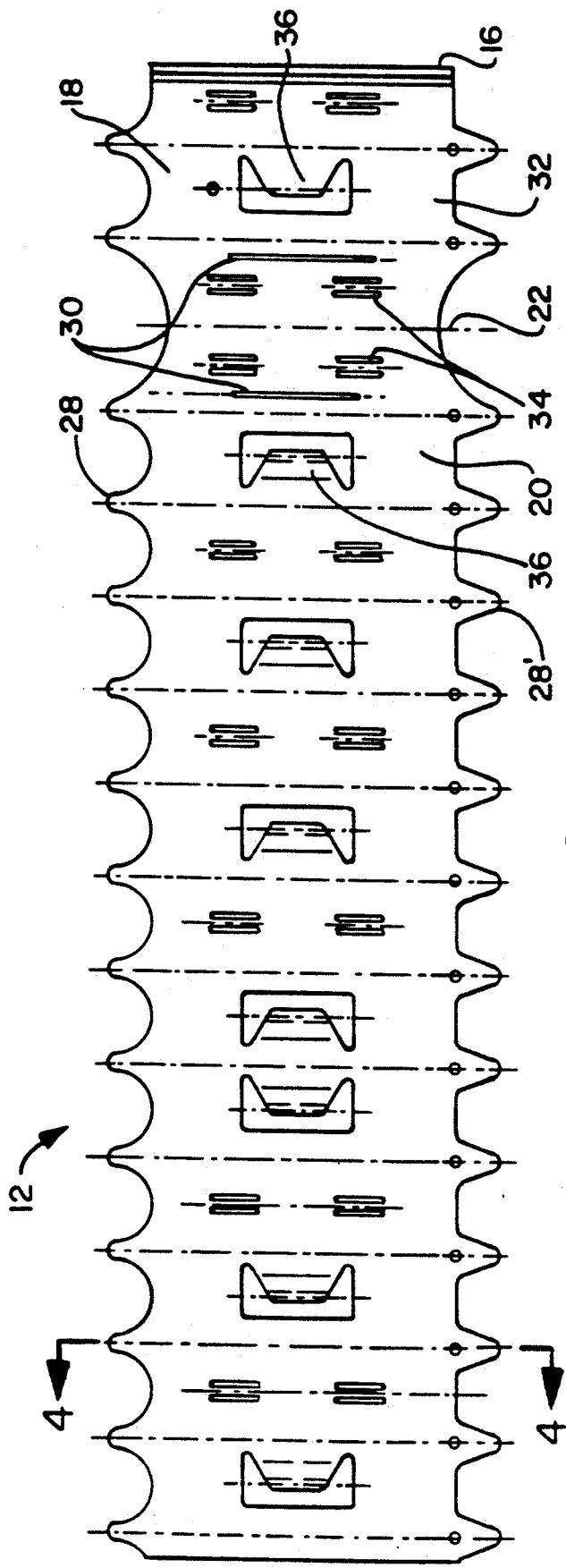
FIG. 2 is a perimeter strip grid corner-piece of increased flatness due-to stress relieving slots in its two flat side sections adjacent the corner bend line where both sections have small cut-outs for fuel rod supporting arches adjacent the bend line.
Figure 3:
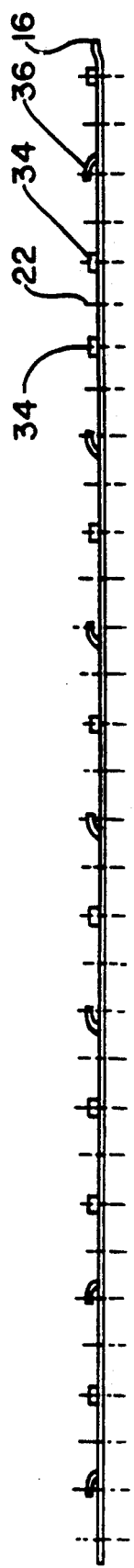
FIG. 3 is a plan view of the strip of FIG. 2.

As a comparison of FIG. 1 and its' flat sections 18 and 20, with FIGS. 2 and 3, and their flat sections 20 and 32, will show, it is possible to have transverse slots 30 in the flat sections on each side of the bend or bend line 22. This depends on whether the flat section 18, 20 or 32 is interrupted by fuel rod support arches 34 or by springs 36. The flat side sections 20 and 32 with arches 34 adjacent bend line 22 having much less cut-out periphery for stress relief that the flat side 18 which has a large spring 36 cut-out adjacent bend line 22 which will inherently stress relieve the corner-bend 22.

It will thus be seen that a perimeter strip grid corner-piece of increased flatness having two flat-side sections on either side of transverse bend line 22 is provided whether or not the fuel rod support structure on one or both sides of said bend line is a small cut-out for arches 34. This stress-relief is accomplished without a significant weakening of the strip in the portion or area near bend 22 containing the slot 30. It therefore maintains its required rigidity.

I claim:

1. A nuclear fuel grid having a perimeter strip grid corner-piece of increased flatness having at least two flat plane side sections on either side of a transverse corner bend and having a continuous corner bend in said perimeter strip along a line of varying radii in its transverse direction with the outer longitudinal end portions of said bend having a grater radius than its inner portions; said perimeter strip characterized by:

an elongated transverse fully open slot in said perimeter strip spaced from said bend line in a flat side section thereof;

said transverse slot extending such that its entire perimeter lies in one flat plane and there is an equal slot perimeter length of said open slot on either side of the longitudinal center line of said flat section.

2. The perimeter strip of claim I in which the length of said slot is approximately ⅛ to ½ of the width of said flat section.

3. The perimeter strip of claim 1 in which the width of said slot is less than twice the thickness of the strip material.

4. The perimeter strip of claim I in which there are transverse slots in each of the flat side sections on either side of the bend line.

5. The perimeter strip of claim I in which a flat side section is interrupted by arches and springs for fuel rod support and pilot holes, and the slot is adjacent said arches on one side of said bend line, only.

* * * * *